Feb. 26, 1935.  A. J. PENICK ET AL  1,992,503

COUPLING

Filed April 11, 1933

Inventors
Arthur J. Penick
Kirby T. Penick
By
Hardway Cather
Attorney

Patented Feb. 26, 1935

1,992,503

UNITED STATES PATENT OFFICE 1,992,503

COUPLING

Arthur J. Penick and Kirby T. Penick, Houston, Tex.

Application April 11, 1933, Serial No. 665,496

2 Claims. (Cl. 285—129)

This invention relates to a coupling.

An object of the invention is to provide a coupling of the character described specially designed for connecting sections of pipe, or the like, and of such construction that the parts may be easily and quickly coupled together or separated.

Another object of the invention is to provide a coupling of the character described composed of two coupling members internally threaded to receive the ends of the sections of pipe to be connected with novel means for connecting said coupling members together so as to form a fluid tight joint and whereby the coupling members may be readily assembled or separated.

With the above and other objects in view, the invention has particular relation to certain novel features of construction, arrangement of parts and use, an example of which is given in this specification and illustrated in the accompanying drawing, wherein.

Figure 2:
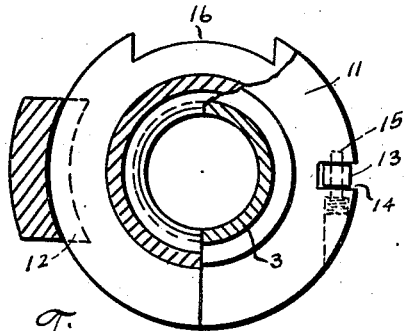
Figure 2 shows a transverse sectional view taken on the line 2—2 of Figure 1.

In the drawing the numerals 1 and 2 designate confronting coupling members which are internally threaded to receive the ends of the connected pipe sections 3 and 4. The coupling member 2 has an external annular flange 5 at its inner end provided with the marginal notch 6 and the coupling member 1 has the external flared shoulder 7 at its inner end. The facing ends of the couplings 1 and 2 have the opposing annular grooves 8, 9 in which is seated the seal ring 10 which forms a fluid tight joint between said coupling members.

Around the coupling member 1 there is an annular clamp flange 11, which at one side, has the depending clamp 12 adapted to engage underneath the flange 5 when the parts are assembled, and opposite this clamp there is a clamp bolt 13 whose upper end is fitted into a notch 14 of the flange 11 and pinned therein by the pivot pin 15.

Figure 1:
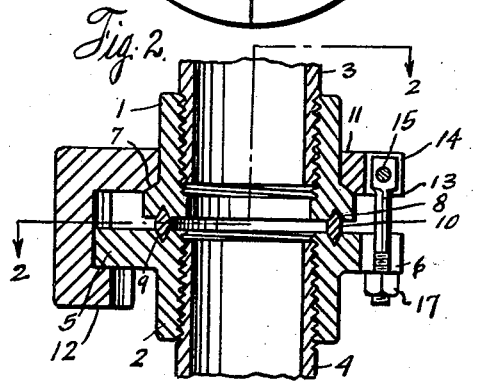
Figure 1 shows a longitudinal sectional view of the coupling.

In the form shown in Figures 1 and 2, the clamp ring 11 has a marginal notch 16 and in this form in assembling the parts the clamp 12 may be passed through the notch 16 and the ring 11 then turned to engage the clamp 12 underneath the flange 5 and to align the notches 6, 14. The bolt 13 may be then swung into the notch 6 and a nut 17 screwed on to the free end of the bolt 13 and tightened up to clamp the parts in assembled relation.

Figure 3:
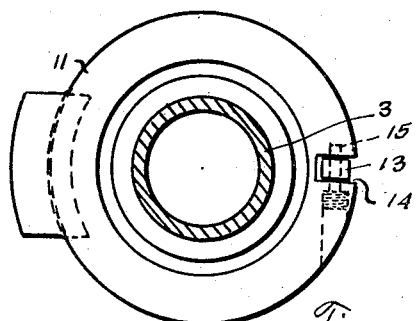
Figure 3 shows an end view of a modified form thereof.
Figure 4:
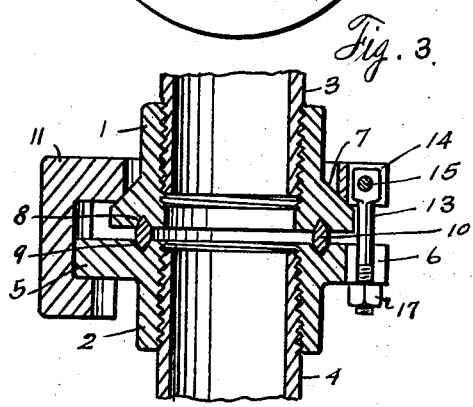
Figure 4 shows a longitudinal sectional view of said modified form.

In the form shown in Figures 1 and 2 the clamp ring 11 fits closely over the coupling member 1 but in the form shown in Figure 4 the clamp ring 11 is fitted loosely on the coupling member 1. Accordingly in the form shown in Figures 3 and 4 the marginal notch 16 is not necessary, for the reason that the ring 11 will have sufficient lateral play relative to the coupling member 1 to permit the parts to be assembled as shown in Figure 4 and the bolt 13 may then be swung into the notch 6 and the nut 17 tightened up as above explained.

Figure 5:
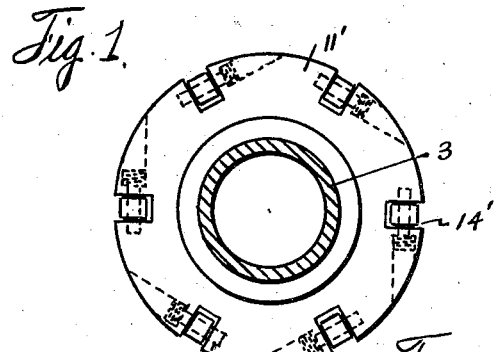
Figure 5 shows an end view of still another modification.
Figure 6:
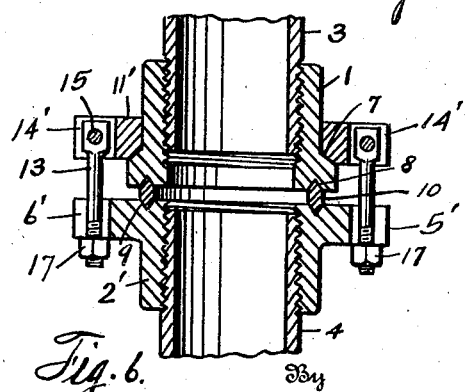
Figure 6 shows a longitudinal sectional view of the form shown in Figure 5.

In the form shown in Figures 5 and 6 the coupling 1 is similar to that shown in Figure 1 and the coupling 2' has an external annular flange 5' at its inner end provided with a plurality of marginal notches 6'. Fitted around the coupling 1 there is the annular clamp ring 11' having the marginal notches 14' aligned with the notches 6'. In this form the bolts 13' each have one end pivoted in the corresponding notch 14' by a pivot pin 15 and the other ends of these bolts may be swung into the corresponding notches 6' and the nuts 17 then tightened up to clamp the assembled parts together. In other respects the form shown in Figures 5 and 6, is the same as that shown in Figure 1.

The drawing and description disclose what are now considered to be preferred forms of the invention by way of illustration only while the broad principle of the invention will be defined by the appended claims.

What we claim is:

1. A coupling comprising two coupling members having facing annular grooves, a seal ring in said grooves, one coupling member having an annular flange, an external shoulder on the other coupling member, a clamp ring on said shoulder around the corresponding member, said ring and flange being provided, one with a marginal notch and the other with a pivotally mounted bolt received by said notch, a clamp nut threaded on the free end of the bolt and abutting the adjacent, notched part, a marginal clamp on said ring, said flange having a marginal notch to permit the passage of the clamp therethrough whereby the ring may be turned to engage the clamp with the outer side of the flange.

2. A coupling comprising two coupling members, one of said members having an annular flange, an external shoulder on the other coupling member, a clamp ring on said shoulder around the corresponding member, said ring and flange being provided one with a marginal notch and the other with a pivotally mounted bolt received by the notch, a clamp nut threaded on the free end of the bolt and abutting the adjacent notched part, a marginal clamp on the ring, said flange having a marginal notch to permit the passage of the clamp therethrough whereby the ring may be turned to carry the clamp into engagement with the flange.

ARTHUR J. PENICK.
KIRBY T. PENICK.